United States Patent [19]

Wirick et al.

[11] Patent Number: 4,480,372
[45] Date of Patent: Nov. 6, 1984

[54] PROCESS OF FABRICATING TARGET FOR CALIBRATING AND TESTING INFRARED DETECTION DEVICES

[75] Inventors: Michael P. Wirick, Los Angeles; James P. Wright, Redondo Beach, both of Calif.

[73] Assignee: Hughes Aircraft Company, El Segundo, Calif.

[21] Appl. No.: 471,081

[22] Filed: Apr. 25, 1983

Related U.S. Application Data

[62] Division of Ser. No. 255,966, Apr. 20, 1981, Pat. No. 4,387,301.

[51] Int. Cl.³ .............................................. B23P 25/00
[52] U.S. Cl. ..................................... 29/458; 29/611; 29/460
[58] Field of Search ................... 29/458, 460, 611; 250/252.1, 338, 347, 211 J; 374/1, 2

[56] References Cited

U.S. PATENT DOCUMENTS

| | | | |
|---|---|---|---|
| 3,220,592 | 11/1965 | Powell et al. | 29/458 X |
| 3,283,148 | 11/1966 | Schwarz et al. | 250/252.1 X |
| 3,284,889 | 11/1966 | Flitman et al. | 29/458 |
| 3,596,096 | 7/1971 | Koehler | 374/1 X |
| 3,596,097 | 7/1971 | Robillard | 250/338 X |
| 3,694,624 | 9/1972 | Buchto | 374/2 X |
| 3,986,384 | 10/1976 | Giorgi | 250/252.1 X |
| 4,047,032 | 9/1977 | Judge et al. | 250/338 |
| 4,058,734 | 11/1977 | Vroombout | 374/1 X |
| 4,309,901 | 1/1982 | Rolinski et al. | 374/1 X |

Primary Examiner—Charlie T. Moon
Attorney, Agent, or Firm—D. W. Collins; W. J. Bethurum; A. W. Karambelas

[57] ABSTRACT

Apparatus for calibrating and testing infrared detection devices is provided. The apparatus comprises a substrate which supports a target pattern of dielectric material which is at least partially absorbing to infrared radiation. A heater is used to supply heat to the substrate. Since the substrate and dielectric material have different emissivities, an apparent temperature difference is perceived by an IR detection device. As a consequence, temperature differences as low as about 0.02° C. and below can be generated for calibrating and testing IR imaging devices.

12 Claims, 6 Drawing Figures

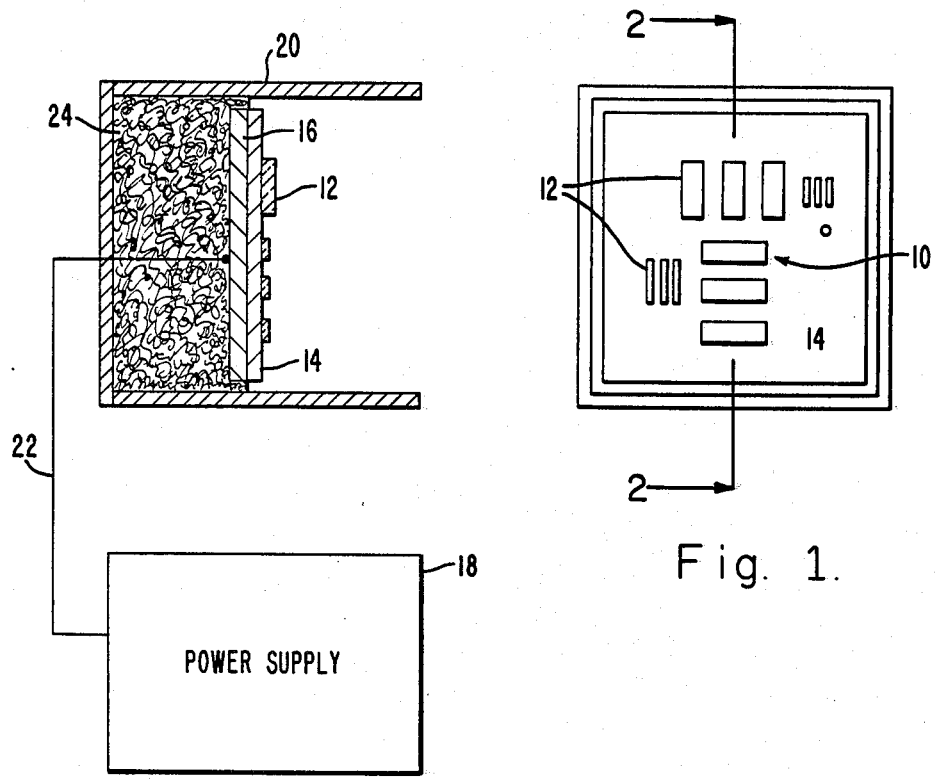

AMBIENT BACKGROUND TEMPERATURE, °C

PROCESS OF FABRICATING TARGET FOR CALIBRATING AND TESTING INFRARED DETECTION DEVICES

This is a division of application Ser. No. 255,966, filed Apr. 20, 1981, now U.S. Pat. No. 4,387,301, issued June 7, 1983.

BACKGOUND OF THE INVENTION

1. Field of the Invention

This invention relates to the calibration and testing of infrared radiation detection devices.

2. Description of the Prior Art

Infrared detection devices such as infrared receivers, forward looking infrared systems, infrared imaging systems and imaging radiometers are designed to detect differences in heat radiated from an object or scene. There is a need to calibrate and measure the performance of such devices, that is, to provide a measure of how well the device can resolve the image of an object of a given temperature in a background having a temperature near that of the object itself. A high resolution detection device must have the capability of perceiving small differences in temperature among closely spaced objects in the field of view.

Apparatus and methods for calibrating and testing infrared detectors are well-known; see, e.g., U.S. Pat. Nos. 3,596,096; 3,845,295; 3,971,886; 3,986,384; and 4,047,032. However, the disclosed apparatus and methods suffer from one or more of the following disadvantages: they do not provide a desired spatial resolution of temperature differentials ($\Delta T$) of about 0.01° C., or are cumbersome, or are not suitable for use in a remote field environment having uncontrolled ambient temperature or are expensive.

SUMMARY OF THE INVENTION

In accordance with the invention, an apparatus is provided for calibrating and testing infrared detection devices which comprises (a) a substrate having a front surface and a back surface;

(b) a target pattern comprising dielectric material formed on at least one region of the front surface of the substrate, the dielectric material being at least partially absorbing to infrared radiation; and (c) means for providing heat to the back surface of the substrate sufficient to provide at least one apparent differential temperature contrast between the target pattern and the substrate.

Using the apparatus of the invention, infrared detection devices are calibrated and tested by applying heat to the target pattern, sensing at least one differential temperature contrast between the target pattern and the substrate supporting it, and comparing the resulting contrast with either a visual or electronic depiction of the scene being detected.

The apparatus of the invention is capable of providing temperature differences ranging from about 10° C. down to at least 0.02° C. Importantly, the apparatus is useful in the field, where ambient temperatures are characteristically not controllable and where its compact size is advantageous. Finally, the apparatus is considerably less expensive than prior art apparatus.

BRIEF DESCRIPTION OF THE DRAWING

FIG. 1 is a front elevation view of the testing and calibrating apparatus of the invention;

FIG. 2 is a cross-section of the apparatus of FIGS. 1 through 2—2;

DETAILED DESCRIPTION OF THE INVENTION

Figure 3A:
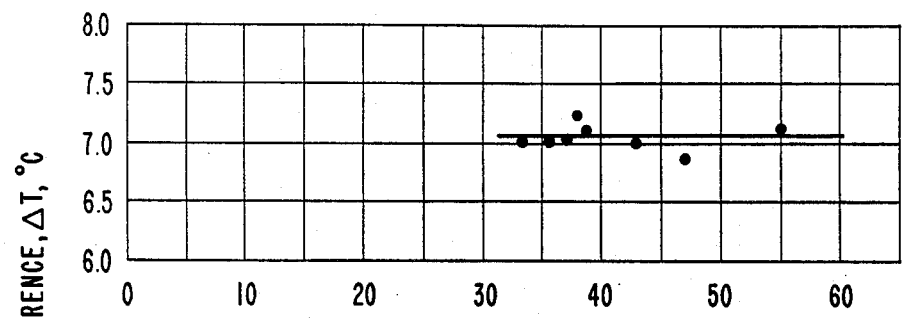
FIGS. 3a and 3b, on coordinates of temperature difference in °C. and ambient background temperature in °C., depicts the variation of target temperature with changing background temperature for a particular dielectric material and test pattern.

The apparatus for calibrating and testing IR detection devices produces a precise contrast (apparent differential temperature) under uncontrolled ambient temperature conditions. Referring to FIGS. 1 and 2, the apparatus, or infrared resolution target, comprises a target pattern 10 of dielectric material 12 formed on a substrate 14, which has a relatively constant heat input to provide a thermal flux. By control of dielectric material composition and thickness and surface roughness of the substrate, different parts of the resolution target may have controlled, different absorptivities, transmissivities and emissivities. Thus controlled, the target will appear to have one or more differential temperatures (contrasts) to an imaging radiometer or other infrared detection device. Different contrasts are achieved, for example, by forming parts of the target pattern to different thicknesses. For clarity, the thicknesses of the dielectric material forming the target pattern have been exaggerated.

The substrate 14 comprises a material having sufficient heat conductivity and being thin enough to pass heat from one of its major surfaces to the other. Examples of suitable substrate materials include aluminum, copper, silver and nickel, which have high heat conductivities. For such materials, the thickness need only be sufficient to provide support for the pattern of dielectric material to be formed on one surface. For example, aluminum substrates conveniently range from 0.005 to 0.5 inch in thickness.

A thin metallic film (not shown) may be overcoated on the metal substrate to provide a higher background emissivity or to protect the underlying substrate. For example, a thin film (e.g., 400 Å) of nickel may be deposited on an aluminum substrate. Nickel has a higher emissivity than aluminum, which implies a more rapid change in differential temperature with the dielectric material thickness and hence greater sensitivity. Further, the nickel coating stabilizes the aluminum substrate against aging effects.

The target pattern 10 comprising dielectric material 12 is formed on at least one region of one surface of the substrate. The dielectric material is formed in a pattern such that following a slight delay from application of heat, at least one apparent differential temperature contrast is observable between the dielectric material and the substrate. For convenience and in compliance with current minimum resolvable temperature test practices, an array of at least two, and preferably three or four, bars of dielectric material of a particular thickness is formed on the substrate. To provide a range of temperature differentials, a plurality of such arrays, as depicted in FIG. 2, is provided. Each array evidences different apparent temperature/emissivity characteristics.

The dielectric material 12 must be at least semiabsorbing in the infrared and in any event cannot be totally transparent, since there would be no variation in emissivity as compared with the substrate. There are many suitable dielectric materials which may be employed in the practice of the invention. Examples include silica ($SiO_2$), titania ($TiO_2$), polyethylene, neutral density glass (crown-type glass with absorbing particles added to the melt), alumina ($Al_2O_3$) and zinc selenide (ZnSe).

The thickness of the dielectric film must not exceed the depth of field of the infrared detection device's focal plane, which provides an upper limit for most applications of about 0.005 inch. Further, no absorption occurs for thicknesses less than about 100 Å. Thus, the thickness of the dielectric film ranges from about 100 Å to 0.005 inch. In practice, the upper range is usually limited to about 20,000 Å if thin film vacuum deposition procedures are utilized, since technical problems exist in maintaining film homogeneity at greater vacuum deposition thicknesses.

Although a variety of procedures may be employed to fabricate the dielectric film pattern, it is advantageously produced by thin film vacuum deposition of the desired dielectric material through a metal mask such as nickel, the mask having the desired target pattern etched therethrough. Thickness of the dielectric material is conveniently controlled by covering one or more portions of the patterned mask during the deposition.

Means for applying heat to the backside of the substrate conveniently comprises a heater 16 such as a resistance film in silicone rubber sheet, available from Minco Products, Inc. (Minneapolis, MN). The heater is supplied with power from a power supply 18. The power supply need not be precisely contolled; typically, a variation of 10% will result in only a 1% variation in temperature difference.

A simple configuration is depicted in FIG. 2, which shows the target plate or substrate 14 mounted in a shield box 20. The heater 16 is mounted just behind the substrate and is electrically connected to the power supply 18 by a cable 22. Insulation 24 is provided behind the heater to retain heat and prevent undesired heat losses.

In operation, calibration and testing of IR detection devices is accomplished by applying a substantially constant voltage to maintain an essentially constant heat on the substrate supporting the target pattern. The target pattern, in conjunction with the substrate, provides two emissivity areas—one of high emissivity (the target pattern) and the second of low emissivity (the substrate). Both receive heat from the same source and are at nearly the same temperature; however, the target pattern emits more IR radiation (heat) because of its higher emissivity. Therefore, an apparent temperature difference is perceived between the target pattern and substrate; it is this temperature difference which is used to calibrate and test an IR detection device. Control over the apparent temperature difference is obtained by controlling the thickness of the dielectric material forming the target patterns and can be augmented by employing two or more different dielectric materials as the target pattern. Employing a combination of varying thicknesses and/or dielectric materials provides a range of apparent temperature differences.

These apparent temperature differences can then be used to calibrate and test an IR detection device in much the same way as conventional test apparatus. Typically, several four bar patterns are designed with a particular spacing between bars (spatial frequency), but with apparent temperatures chosen to bracket the detection device MRTD (minimum resolvable temperature difference) specified at this particular bar spatial frequency. Comparison is made of these patterns to see which one is just resolved, and the apparent temperature difference of that just resolved pattern is taken as the detection device MRTD for this particular spatial frequency. By including several different spatial frequency sets of four bar patterns and determining the MRTD for each set, data is collected from which the detection device MTF (modulation transfer function) may be calculated.

The emissivity is dependent on the thickness of the dielectric material used as the target pattern. For example, on a substrate having an emissivity of 0.35, thicknesses on the order of hundreds of Angstroms provide a low emissivity of about 0.4, while films on the order of tens of thousands of Angstroms thick provide comparatively higher emissivities of about 0.9.

For each $\Delta T$, there is one target pattern array on a substrate. If more than one $\Delta T$ is required for test of a specific detection device, then additional target pattern arrays are formed on the substrate. There are three methods for controlling $\Delta T$: heater power, dielectric film thickness and composition of dielectric film. Small $\Delta T$s are achieved by using a combination of low power, thin films and a film of a composition having an emissivity close to that of the substrate. For example, a very low $\Delta T$, such as 0.02° C., is achieved by employing a dielectric film with very low absorption (e.g., 100 Å of $SiO_2$) so that the emissivity of the substrate is barely changed, say from 0.35 to 0.36.

The substrate, or overcoated background material, emissivity should be chosen to provide the desired sensitivity of $\Delta T$ to dielectric film thickness (i.e., assuming the same heater power input, if gold of emissivity 0.04 were used in place of nickel of emissivity 0.55 for the background, then 100 Å of silica would yield a $\Delta T$ of about 0.2° C. instead of 0.02° C., as for the nickel background). The background material should also be selected for good stability of emissivity with aging. Gold, aluminum and silver are less desirable than nickel in this regard. So long as the background metallic layer is sufficiently thick to evidence zero transmission (typically at least about 50 Å for most metals), its emissivity is a constant of the material and is independent of thickness.

EXAMPLES

EXAMPLE 1

A target similar to that shown in FIG. 1 was designed and fabricated for performance evaluation with respect to changing ambient background temperature. The target comprised a two bar pattern, with the bars painted on an aluminum disc of 20 μm rms surface roughness coated with a thin film of nickel. The paint used for the bars was Liquid Retype (available from Wirth Company of Hayward, CA), which comprises about 5 to 10% hydrocarbons, about 24 to 30% titanium dioxide and about 35 to 65% solvent. The emissivity of the target bars was 0.93 and that of the target background about 0.55. The bars widths and separations were 0.080 inches each. The target was located at the bottom of a 1.5 inch long tunnel with wall emissivity about 0.94. A strip heater was located in the tunnel wall to simulate background temperature and a thermistor was also in the wall to monitor the simulated background temperature. At the opening of the tunnel, a double airspaced window of clear polyethylene was provided in order to minimize cooling of the chamber by convection and conduction. A heater was mounted in contact with the aluminum target disc for providing target heat, and a thermistor was placed behind the heater to monitor the target temperature.

The equipment employed to perform the tests on the target consisted of a UTI Model 900 Thermal Imager and a Quantex DIP 9 Image Processor. The spectral bandpass of the imager was limited to the 8 to 14 μm waveband by filtering. Differential temperature measurement accuracy limit of the imager was ±0.017° C.

Figure 3B:
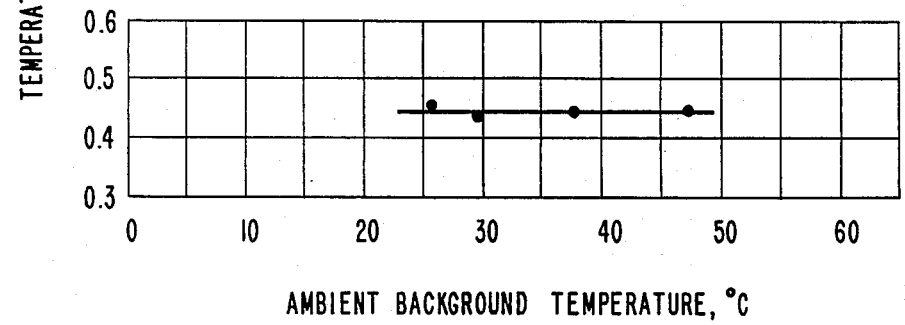

With a target ΔT of 7.0° C., the measured change in ΔT was less than 0.1° C. over an ambient background temperature range of 33.5° to 55.1° C. With a target ΔT of 0.45° C., the change in ΔT was less than 0.02° C. for 25.4° to 47.6° C. backgrounds. A plot of the measured data for each set of conditions is shown in FIG. 3. From FIG. 3, it can readily be seen that the apparent target temperature is quite insensitive to the ambient background temperature in which it is placed.

Measurements of emissivity target temperature uniformity made on the test target indicated better than 0.02° C. uniformity. Temperature uniformity tests were preformed at target apparent temperature differences of 0.2°, 0.3° and 1.0° C.

Figure 4A:
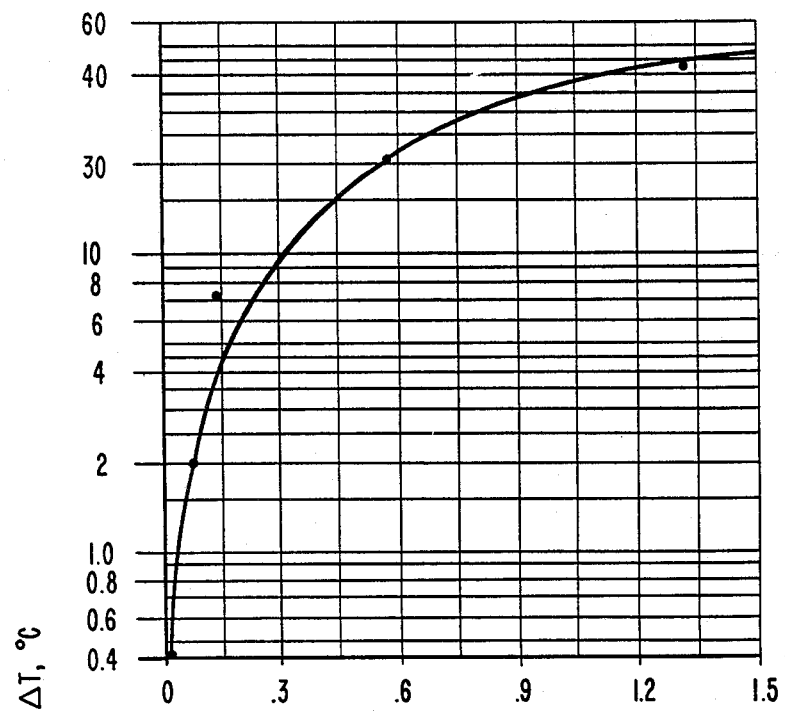
FIGS. 4a and 4b, on coordinates of temperature difference in °C. and input power in watts, depicts the variation in apparent temperature difference as a consequence of heater input power for a particular dielectric material and test pattern.
Figure 4B:
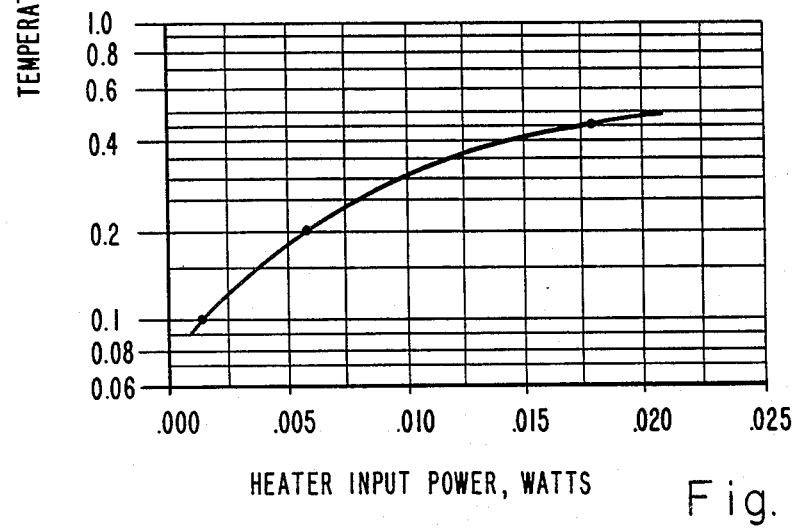

The results of measurements of heater input power over two ranges versus apparent temperature difference are given in FIG. 4. The data show that the target had a very low power consumption and that the ΔT is relatively immune to small variations in power, thereby eliminating the need for large, highly regulated power sources.

EXAMPLE 2

A second target was used to evaluate the minimum resolvable temperature difference (MRTD). The target consisted of a series of four bar patterns for each of four spatial frequencies, in the range of 0.002 to 0.020 inch or 0.1 to 1.0 milliradians angular subtense for a 10 inches radiometer focal length. The pattern series for each spatial frequency bracketed the acceptable MRTD at that frequency representing a go-no go display for an observer. An aluminum disc of 12 μm rms mask surface roughness was the target substrate, and thin films of nickel (400 Å) for the background and $SiO_2$ (100 to 10,000 Å) for the bars were deposited in turn on the substrate to generate the background and bar emissivities, respectively, that in turn produced the required apparent temperature differences. The pattern employed was similar to that depicted in FIG. 1.

The equipment employed to perform the tests was the same as that described in Example 1.

The measured target temperature calibration errors for 21 target patterns exhibited a range of +1.70° C. to −0.11° C. from the preliminary design calculated values for this thin film target. The average absolute error was 0.50° C. Temperature variations of 1.0° to 1.5° C. over the target background were measured, due to non-uniform nickel film thickness.

What is claimed is:

1. A process for fabricating apparatus for calibrating and testing infrared detection devices comprising
   (a) providing a heat conducting substrate having a front surface and a back surface;
   (b) forming on at least a region of said front surface of said substrate a target pattern comprising dielectric material, said dielectric material being at least partially absorbing to infrared radiation; and
   (c) assembling on the back side of said substrate a heating means that developes heat sufficient to heat said back surface of said substrate such that at least one apparent differential temperature contrast between said target pattern and said substrate will be obtained.

2. The process of claim 1 in which said substrate is of sufficient conductivity and thin enough to pass heat from said back to said front.

3. The process of claim 2 in which said substrate comprises a material selected from the group consisting of aluminum, copper, silver and nickel.

4. The process of claim 3 in which said substrate comprises aluminum.

5. The process of claim 2 in which prior to forming said target pattern, a metallic coating is formed on said front surface to a thickness of at least about 50 Å.

6. The process of claim 5 in which said metallic coating comprises a material selected from the group consisting of nickel, gold, aluminum and silver.

7. The process of claim 6 in which said metallic coating comprises nickel.

8. The process of claim 1 in which said dielectric material consists essentially of at least one material selected from the group consisting of silica, titania, polyethylene, neutral density glass, alumina and zinc selenifide.

9. The process of claim 8 in which said dielectric material consists essentially of silica or titania.

10. The process of claim 1 in which said dielectric material is formed to a thickness ranging from about 100 Å to 0.005 inch.

11. The process of claim 10 in which said dielectric material is formed to a thickness ranging from about 100 to 20,000 Å.

12. The process of claim 1 in which said heating means comprises a heater and means for supplying power to said heater.

* * * * *